June 18, 1968  G. A. GERSTMEIER  3,389,363

SHAFT RETAINER FOR VARIABLE RESISTANCE DEVICE

Filed Oct. 18, 1967

INVENTOR.
GEORGE A. GERSTMEIER
BY
ATTORNEY

United States Patent Office 3,389,363
Patented June 18, 1968

3,389,363
SHAFT RETAINER FOR VARIABLE
RESISTANCE DEVICE
George A. Gerstmeier, Tustin, Calif., assignor to Beckman Instruments, Inc., a corporation of California
Filed Oct. 18, 1967, Ser. No. 676,186
6 Claims. (Cl. 338—176)

ABSTRACT OF THE DISCLOSURE

Relates to a variable resistance device including a resistance element mounted in a suitable housing having a shaft opening through which a rotatable shaft is positioned for driving a movable contact over the resistance element. The shaft is retained within the shaft opening by means of a ball inserted against a beveled or frusto-conical surface of the shaft through a second opening intersecting the shaft opening, the ball being of sufficient size to produce an interference fit with the side walls of the second opening when inserted therein and is retained firmly against the frusto-conical surface of the shaft.

---

The invention relates generally to variable resistance device such as potentiometers, variable resistors and the like and is more particularly directed to means for retaining an adjustment shaft in a housing of such a device. Variable resistance devices usually employ a movable contact or wiper which traverses over a surface of a resistance element as a pick off device for varying the potential or the resistance of a circuit connected to the resistance element. The position of the wiper or movable contact is often adjusted by rotating a partially threaded shaft which extends through the housing and is supported by the walls of the housing. Such a shaft may be used whether the contact or wiper is moved on an annular resistance element by a worm gear drive or on an elongated resistance element by a threaded traveling nut or other such arrangement. In any case, there can be no permissible axial movement of the shaft once the contact is adjusted or the result is an extremely inaccurate device with very little setting stability.

Various arrangements have been employed for retaining such a shaft in a housing. One such arrangement employs a pin positioned within an opening in the housing so that it bears against a shoulder on the shaft. A number of difficulties arise from this approach, one of which relates to dimensional tolerances. If there is any gap between the pin and the shaft shoulder, the shaft is loose. On the other hand, if the pin is retained too tightly against the shaft shoulder, the shaft may be difficult to turn. In order to retain the end of the pin in the opening securely against the drive shaft, it is usually necessary to provide threads on the walls of the pin opening and on the pin. This requires additional manufacturing steps and increases the cost.

It is an object of the present invention to provide a new and improved arrangement for retaining a rotatable shaft within a shaft opening formed through a side wall of the housing of a variable resistance device.

Further objects and advantages of the invention will become apparent as the following description proceeds, and the features of novelty which characterize the invention will be pointed out with particularity in the claims annexed to and forming a part of this specification.

For a better understanding of the invention, reference may be had to the accompanying drawings in which.

Figure 1:
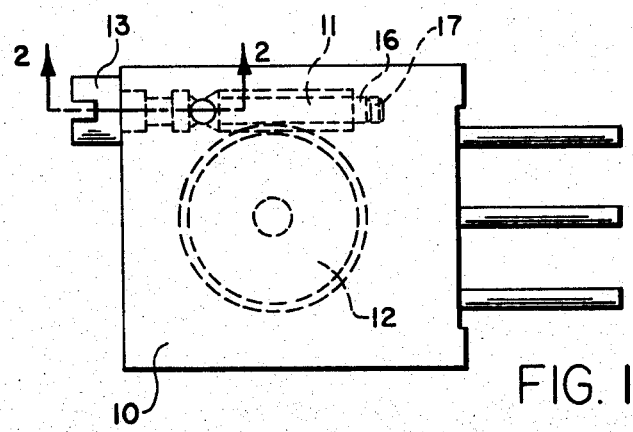
FIGURE 1 is a plan view of a variable resistance device employing a shaft for driving a gear wheel adapted to rotate a movable wiper against a resistance element within the variable resistance housing.

Referring now to FIGURE 1, there is shown in a variable resistance device in the form of a square trimmer potentiometer having a housing 10 enclosing a cavity adapted to receive a resistance element. The housing 10 is preferably molded from a plastic material or cast from a metal alloy. Preferably the housing is formed of a non-conductive insulating material. In this type of device, the resistance element (not shown) is usually annular in shape and is traversed by a movable wiper (not shown) which is attached to or driven by a gear member, such as gear member or wheel 12 shown in dotted lines in FIGURE 1.

In order to drive the gear 12 and thus, to rotate the wiper or electrical contact over the resistance element, there is provided a drive shaft or worm gear 11 positioned through a shaft opening in a side wall of the housing. The shaft is usually provided with a headed end section 13 which may be rotated by a screw driver or other tool. Engagement of the worm gear portion of the shaft with the gear wheel, positioned within the housing, promotes rotation of the adjustment components attached to the movable wiper within the housing.

The shaft 11 is preferably formed of a metallic material, such as stainless steel, and is supported within a side wall or section of the housing which acts as a bearing for the shaft. As may best be seen in FIGURE 2, the shaft 11 is positioned through a shaft opening 14 formed through a side wall of the housing and is normally positioned so that the head 13 of the shaft abuts against the side 15 of the housing. As shown in FIGURE 1, the opposite end 16 of the shaft may be retained in a suitable bearing section formed by a cavity 17 drilled, molded or otherwise formed in the housing.

Figure 2:
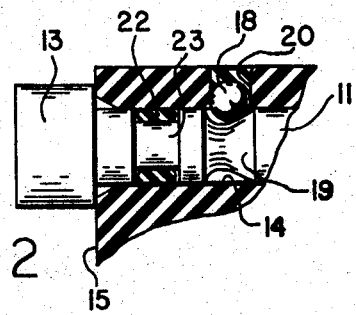
FIGURE 2 is an enlarged cross-sectional view taken essentially along the line 2—2 of FIGURE 1.

As may be seen in FIGURE 2, shaft 11 is securely locked in the position within the shaft opening 14 by means of a ball 18, which seats against a beveled or frusto-conical surface 19 machined in the shaft 11. The ball 18 is positioned against the shaft surface 19 through a second opening 20 formed through a side wall of the housing. The second opening 20 intersects the shaft opening 14 in the region of the frusto-conical surface 19 on the shaft.

The diameter or dimensions of the second opening 20 with respect to the dimensions or diameter of the ball 18 are such that an interference fit is promoted between the side walls of the second opening 20 and the outer surfaces of the ball 18. When the shaft is positioned as far into the shaft opening as it will go the ball 18 is pressed into the second opening 20 against the frusto-conical surface 19 of the shaft, the ball retains the shaft securely in place with the head 13 thereof retained securely against the side 15 of the housing.

The ball 18 should be formed of stainless steel or other metallic incompressible material. In order to further secure the ball in place within the second opening 20 and to retain it therein against the frusto-conical surface of the shaft, it may be desirable to fill the space between the ball and the outer surface of the housing with a potting material of an epoxy or other plastic material. This securely holds the ball in place and also seals the opening 20 against dust and water from the outer environment. As will be seen in FIGURE 2, an O ring 22 is disposed in a shaft gland 23 and forms a seal between the opening 14 and the shaft when it is positioned in the opening 14.

The tolerances for locating the second opening 20 are not as critical as might be required to locate such an opening for a pin type shaft retainer. The ball 18 is required to seat at only one point along the surface of the frusto-conical surface of the shaft. Thus, the position of the opening 20 and its intersection with the shaft opening 14 along its axis can vary a limited amount and the ball will provide proper retaining or locking action against the shaft. Also, it is not essential that the center line of the opening 20 pass through the center line of he shaft opening 14. There may be a reasonable amount of misalignment between these two openings, yet the ball 18 can still be forced into position against the frusto-conical surface of the shaft 11 to retain the shaft securely in position.

Figure 3:
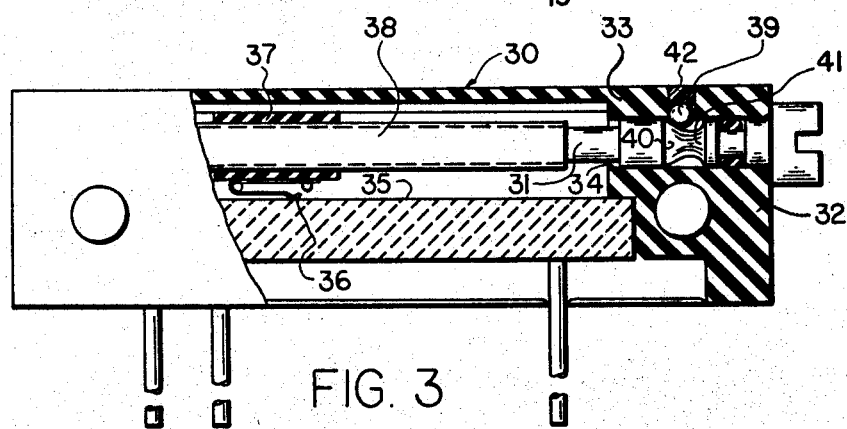
FIGURE 3 is an enlarged side view, illustrating the shaft retaining arrangement of the invention, as employed in a rectangular variable resistance device.

FIGURE 3 illustrates the application of this retaining arrangement to a variable resistance device in the form of a rectangular trimming potentiometer. This "trimmer" is generally designated by the reference numeral 30. In this embodiment, the adjustment shaft 31 is rotatably mounted through an end wall 32 of a housing 33. A shaft opening 34 is molded or machined through the end wall 32 and provides a bearing surface for supporting one end of the shaft 31. The other end of the shaft is suitably supported in an opposite end wall of the housing, such as in a manner similar to that shown for support of the shaft in FIGURE 1. A contact 36 is carried by a block 37 which is threaded onto the threaded section 38 of the shaft. By rotating the shaft 31, the contact 36 is caused to traverse over a resistance element (not shown) formed on the flat surface of the substrate base member 29.

As may be seen in FIGURE 3, the shaft 31 is retained within the shaft opening 34, which forms a bearing surface for the shaft, by means of a ball 39 which is positioned against the frusto-conical surface 40 formed in a gland or relieved section 41 of the shaft. The ball 39 is securely retained by means of an interference fit in opening 42 through which it has been pressed against the beveled or frusto-conical surface 41 of the shaft. If desirable, a potting compound of plastic such as epoxy material may be deposited into the opening 42 above the ball 39 to seal the opening 42 and retain the ball 39 more securely in place therein.

While in accordance with the Patent statutes there has been provided what at present is considered to be the preferred embodiment of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. A potentiometer device comprising:
   a housing enclosing a chamber, said housing having a shaft opening into said chamber through a side wall thereof;
   a resistance element mounted in said chamber;
   a movable contact member engaging said resistance element;
   a rotatable shaft extending into said chamber through said shaft opening and adapted to move said contact member on rotation of said shaft, said shaft having a frusto-conical surface thereon slanting outwardly in a direction away from said end of said shaft extending through said shaft opening;
   means for retaining said rotatable shaft in said shaft opening comprising:
      a second opening in said housing communicating with said shaft opening in a region adjacent said frusto-conical surface of said shaft, and
      a ball member positioned in said second opening against said frusto-conical surface of said shaft, said ball having external dimension of a size adapted to produce an interference fit with the side walls of said second opening so that said ball is retained firmly in place against said frusto-conical surface of said shaft.

2. The potentiometer device defined in claim 1 wherein said second opening is filled with a potting material between said ball retained therein and the outer surface of said housing.

3. The potentiometer device defined in claim 1 in which said housing is formed of a plastic material and said ball member is formed of a metal.

4. A potentiometer device comprising:
   a housing enclosing a chamber, said housing having a shaft opening into said chamber through a side wall thereof;
   a resistance element mounted in said chamber;
   a movable contact member engaging said resistance element;
   a rotatable shaft extending into said chamber through said shaft opening and adapted to move said contact member on rotation of said shaft, said shaft having a head section on one end thereof abutting against the surface of said housing adjacent said shaft opening when said shaft is inserted therein, said shaft having a frusto-conical surface thereon slanting outwardly in a direction away from said head section on said end of said shaft;
   means for retaining said rotatable shaft in said opening comprising:
      a second opening in said housing communicating with said shaft opening in a region adjacent said frusto-conical surface of said shaft, and
      a ball member positioned in said second opening against said frusto-conical surface of said shaft, said ball having external dimensions of a size adapted to produce an interference fit with the side walls of said second opening so that said ball is retained firmly in place against said frusto-conical surface of said shaft and retaining said head, section of said shaft abutting the outer surface of said housing.

5. The potentiometer device defined in claim 4 in which said second opening is filled with a potting material between said ball and the outer surface of said housing.

6. A potentiometer device comprising:
   a housing enclosing a chamber, said housing having a shaft opening through a side wall of said housing communicating with said chamber, said shaft opening through said side wall forming a bearing surface for a rotatable shaft;
   a resistance element mounted in said chamber;
   a movable contact member engaging said resistance element;
   a rotatable shaft extending into said chamber through said shaft opening and adapted to move said contact member on rotation of said shaft, said shaft having a head section on one end thereof abutting against the surface of said housing adjacent said shaft opening when said shaft is inserted therein, said shaft having a frusto-conical surface formed thereon within the region of said bearing surface, said frusto-conical surface slanting outwardly in a direction away from said head section on said end of said shaft;
   means for retaining said rotatable shaft in said shaft opening comprising:
      a second opening through a second side wall of said housing intersecting with said shaft opening in said bearing region thereof adjacent said frusto-conical surface of said shaft, and
      a ball member positioned in said second opening against said frusto-conical surface of said shaft, said ball having external dimensions of a size adapted to produce an interference fit with the side wall of said second opening so that said ball is retained firmly in place against said frusto-conical surface of said shaft, shaft firmly being retained between said contact point on said ball and said bearing surface of said shaft opening.

References Cited

UNITED STATES PATENTS

| | | | |
|---|---|---|---|
| 2,880,293 | 3/1959 | Blanco | 338—175 X |
| 3,054,077 | 9/1962 | Mellor | 338—180 X |
| 3,096,498 | 7/1963 | Tumbusch | 338—131 X |
| 3,099,810 | 7/1963 | Habereder | 338—174 X |
| 3,105,217 | 9/1963 | Ferrell et al. | 338—184 X |
| 3,124,778 | 3/1964 | Youngbeck | 338—131 X |
| 3,242,451 | 3/1966 | Mathison | 338—174 |
| 3,242,453 | 3/1966 | Stout | 338—202 X |

ROBERT K. SCHAEFER, *Primary Examiner.*

H. J. HOHAUSER, *Examiner.*

UNITED STATES PATENT OFFICE
CERTIFICATE OF CORRECTION

Patent No. 3,389,363                            June 18, 1968

George A. Gerstmeier

It is certified that error appears in the above identified patent and that said Letters Patent are hereby corrected as shown below:

Column 4, line 74, "shaft," should read -- shaft with said --.

Signed and sealed this 11th day of November 1969.

SEAL)

Attest:

Edward M. Fletcher, Jr.                      WILLIAM E. SCHUYLER, JR.

Attesting Officer                                    Commissioner of Patents